Nov. 19, 1935.  G. E. PICKUP  2,021,581
CABINET HEATER
Filed April 11, 1934  2 Sheets-Sheet 1

INVENTOR
George E. Pickup
ATTORNEYS

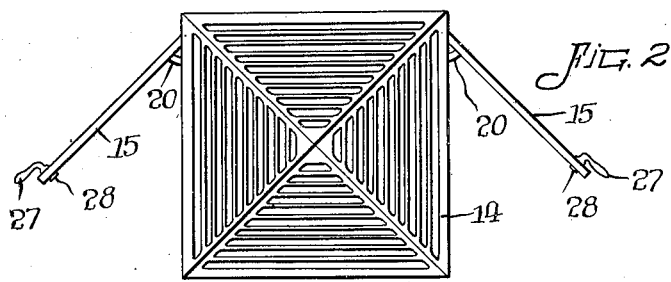
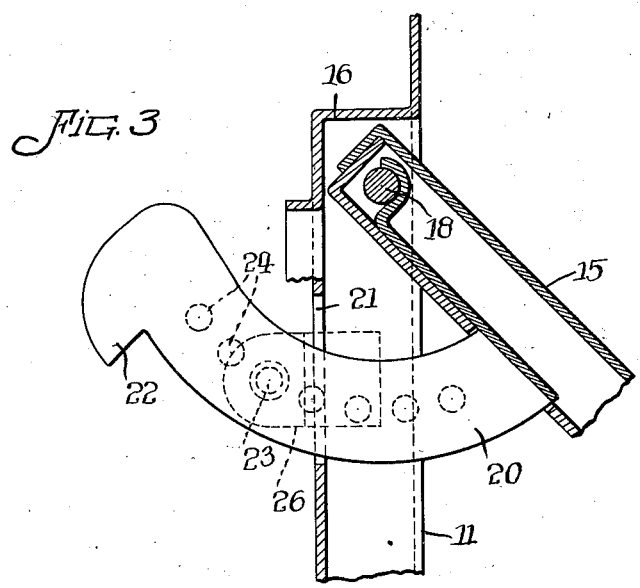
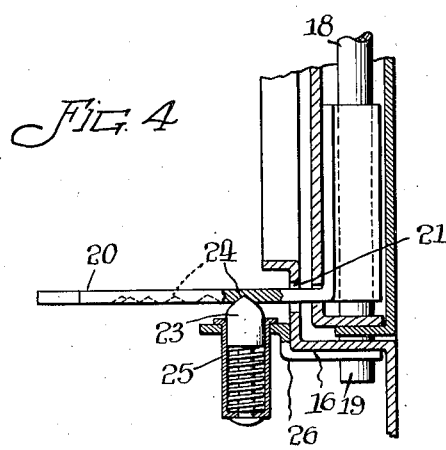

Patented Nov. 19, 1935

2,021,581

UNITED STATES PATENT OFFICE 2,021,581

CABINET HEATER

George E. Pickup, Newark, Ohio, assignor to The Wehrle Company, Newark, Ohio, a corporation of Ohio Application April 11, 1934, Serial No. 719,987

1 Claim. (Cl. 126—67)

The invention pertains to space heaters of the cabinet type and comprising an inner heating unit and an outer casing enclosing the heating unit. Heaters of this type are commonly referred to as circulating heaters in that air is drawn into the open lower end of the casing for passage upwardly around the heating unit and for discharge at the top, usually through an open grillework. Thus, the heater sets up a circulation of air in the room or space to be heated, and has the effect of distributing heated air to points remote from the heater.

The result of such operation is that when the room or other space to be heated is cold, a substantial amount of time is required for the heater to raise the room temperature to the desired degree. Furthermore, the space immediately adjacent the sides and bottom of the heater is the coolest space in the room.

The primary object of the present invention is to provide a heater of the general character indicated, which is constructed so as to permit of the conversion of the heater from the circulating type to a direct radiating heater, in order that the temperature of the space immediately adjacent the heater may when desired be raised with substantially greater rapidity than the more remote portions of the room.

A further object is to provide a cabinet heater comprising an inner heating unit and an outer casing having front, side and rear walls spaced laterally from the heating unit and normally serving to direct currents of air upwardly through the casing, with certain of the walls constructed to provide one or more movable panels for exposing the heating unit and adapted to serve as reflectors for directing the radiated heat as may be desired.

The objects of the invention thus generally stated together with other and ancillary advantages, are attained by the construction and arrangement illustrated in the accompanying drawings forming part hereof wherein:—

Fig. 2 is a plan view of the heater with the panels in partially open position.

Fig. 3 is a fragmentary transverse sectional view on an enlarged scale illustrating a means for holding the panels in various angular positions with respect to the side walls proper.

Fig. 4 is a fragmentary vertical sectional view of the panel-holding means shown in Fig. 3.

Figure 1:
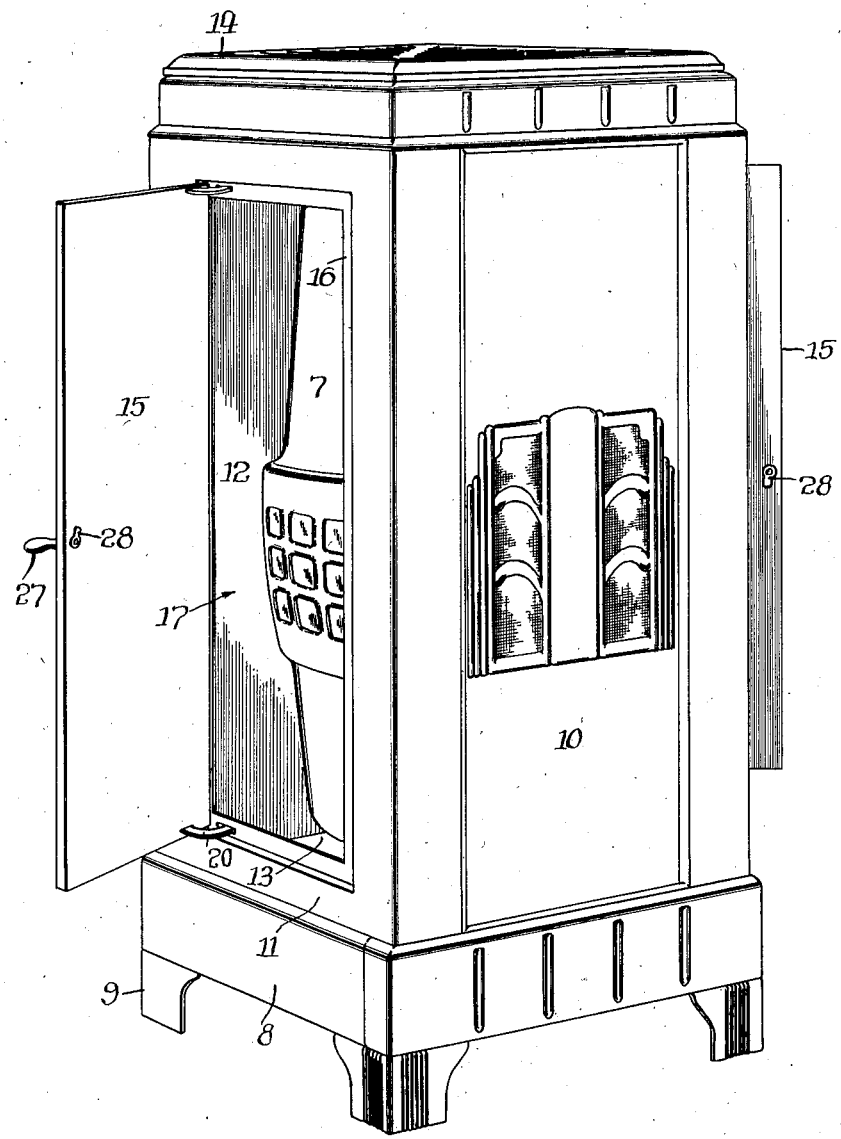
Figure 1 is a perspective view of a cabinet heater having opposite side walls constructed to provide movable panels, which are shown in open position.

In the illustrated embodiment of my invention, the heater comprises a heating unit 7, of any ordinary or preferred character, enclosed within a cabinet structure having a base portion 8 supported in elevated position by means of legs 9. Rising from the base 8 is a casing substantially rectangular in form and having a front wall 10, side walls 11, and a rear wall 12. The bottom of the casing is open as indicated at 13, and the top 14 thereof is constructed to provide an open grille work. The walls 10, 11 and 12 are spaced laterally from the unit 7 and normally serve to direct air currents upwardly around the heating unit for discharge through the grille-work in the top 14. Accordingly, air is drawn into the bottom of the heater through the open lower end 13, passes upwardly through the casing, and discharges at the top for circulation to the remote portions of the room or other space being heated.

Owing to the fact that the air in the room is thus widely distributed by the circulating effect referred to, the space immediately adjacent the sides of the heater has a tendency to remain cool until such time as the room is thoroughly heated. For the purpose of converting the apparatus into a heater capable of direct radiation laterally thereof, I construct certain of the vertical walls so as to permit of direct exposure of the heating unit 7. To this end, I provide, preferably in the opposed side walls 11, two movable panels 15 each normally seated in a frame 16 defining a large opening 17. In the present embodiment the openings 17 extend substantially from top to bottom of the side walls, and are of a width only slightly less than the width of the side walls. When, therefore, the panels 15 are in open position, they no longer serve to direct the air upwardly through the heater, but on the contrary, permit the direct radiation of heat laterally through the opening to the space immediately adjacent the heater.

I have found it desirable to make the panels 15 in the form of doors hinged at the rear edges of the frame 16, so that the panels may be positioned in various angular relations to the plane of the side wall. For this purpose, each of the panels is swingably mounted at its rear edge, in its frame 16, as by means of hinge rods 18 providing trunnions 19 at opposite ends engaging in suitable bearings provided by the frame 16. By this construction, the panels may be swung into various angular relations to their respective side walls so as to govern the amount of direct radiation as may be desired. Moreover, the panels may be variously positioned so as to serve as reflectors for directing the radiated heat outwardly and forwardly.

In order that the panels may be set definitely in various desired positions, they are preferably provided with means for yieldably holding them in any one of a plurality of positions selectively. As herein shown, I provide for this purpose, on each of the panels, an arcuate arm 20 rigid with and projecting inwardly from the inner face of the panel through a horizontal slot 21 in the lower portion of the corresponding frame 16. A stop lug 22 on the inner end of the arm is adapted to engage with the frame 16 at one end of the slot 21 so as to limit the extent of opening movement of the panel. With this arm 20 is associated a spring detent 23 engageable with a series of recesses 24 formed in the lower face of the arm and spaced a short distance apart lengthwise of the arm. The spring detent as shown, comprises a plunger mounted in a tubular casing 25 which in turn, is supported in a bracket 26 secured to the underside of the lower member of the frame 16.

As shown, the panels may be equipped with handles 27 having latch members 28 for engagement with the frame 16 to hold the panels seated within their respective frames 16.

It will be apparent that I have provided a heater wherein by a simple modification of the cabinet structure, the mode of operation may be readily changed at will from the circulating type to a direct radiating heater, and that by the use of movable panels in the side walls of the heater, a definite and positive control of radiation is rendered possible. As a result, the utility of the heater is substantially increased, but owing to the simple construction employed, the cost of manufacture is not materially greater than ordinary circulating heaters.

I claim as my invention:

A room space heater comprising in combination, a vertically elongated heat radiating unit and an enclosing cabinet having a top wall with openings therein permitting the free passage of air therethrough, and front, rear and side walls spaced from the sides of the unit so as to permit the upward passage of air about the unit for discharge through said top wall, each of said side walls having an opening of a size substantially coextensive with the adjacent side radiating surface of said heat radiating unit, panels having inner heat reflecting walls for closing the respective openings, and hinge means supporting said panels at their rear edges for swinging movement on vertical axes whereby to direct heat radiated sidewise from the heating unit forwardly into the room.

GEORGE E. PICKUP.